United States Patent [19]

Wright

[11] Patent Number: 5,079,290
[45] Date of Patent: Jan. 7, 1992

[54] POLY(ARYLENE SULFIDE) COMPOSITION

[75] Inventor: Roy F. Wright, Bartlesville, Okla.

[73] Assignee: Phillips Petroleum Company, Bartlesville, Okla.

[21] Appl. No.: 456,433

[22] Filed: Dec. 26, 1989

[51] Int. Cl.$^5$ .................... C08K 3/34; C08K 3/40; C08L 81/04
[52] U.S. Cl. .................... 524/609; 524/424; 528/486; 528/487; 528/490; 525/537
[58] Field of Search ........... 524/609, 424; 528/486, 528/487, 490

[56] References Cited

U.S. PATENT DOCUMENTS

| | | | |
|---|---|---|---|
| 3,183,283 | 5/1965 | Roding | 260/897 |
| 3,658,753 | 4/1972 | Reed et al. | 524/609 |
| 3,839,301 | 10/1974 | Scoggins | 524/609 |
| 3,919,177 | 11/1975 | Campbell | 260/79 |
| 4,134,874 | 1/1979 | Needham | 260/37 |
| 4,176,098 | 11/1979 | Needham | 524/424 |
| 4,337,182 | 6/1982 | Needham | 524/609 |
| 4,373,091 | 2/1983 | Edmonds, Jr. | 528/486 |
| 4,395,512 | 7/1983 | Kubota et al. | 524/425 |
| 4,447,597 | 5/1984 | Mathis et al. | 528/388 |
| 4,451,601 | 5/1984 | Blackwell | 524/263 |
| 4,474,921 | 10/1984 | Dix | 524/609 |
| 4,529,769 | 7/1985 | Johnson et al. | 524/425 |
| 4,544,700 | 10/1985 | Wright | 524/543 |
| 4,547,551 | 10/1985 | Bailey et al. | 525/240 |
| 4,680,326 | 7/1987 | Leland et al. | 524/106 |
| 4,690,972 | 9/1987 | Johnson et al. | 524/609 |
| 4,699,975 | 10/1987 | Katto et al. | 528/486 |
| 4,728,723 | 3/1988 | Nakamura et al. | 528/487 |
| 4,740,425 | 4/1988 | Leland et al. | 524/424 |
| 4,769,426 | 9/1988 | Iwasaka et al. | 528/388 |
| 4,801,664 | 1/1989 | Nesheiwat et al. | 525/537 |
| 4,820,759 | 4/1989 | Ichikawa et al. | 524/609 |
| 4,835,051 | 5/1989 | Yu | 428/328 |
| 4,845,190 | 7/1989 | Inoue et al. | 528/487 |

FOREIGN PATENT DOCUMENTS

| | | | |
|---|---|---|---|
| 266791 | 5/1988 | European Pat. Off. | 524/424 |
| 0286298 | 12/1988 | European Pat. Off. | |
| 649266 | 1/1989 | Japan | |

*Primary Examiner*—John C. Bleutge
*Assistant Examiner*—Helen F. Lee
*Attorney, Agent, or Firm*—Beverly M. Dollar

[57] ABSTRACT

A composition is provided which consists essentially of a blend of poly(arylene sulfide) polymers, fibrous reinforcement, a hydrotalcite, a nucleating agent, an organosilane, a mold release agent and optionally a pigment. The invention composition is particularly useful for injection molding applications.

33 Claims, No Drawings

POLY(ARYLENE SULFIDE) COMPOSITION

This invention relates to poly(arylene sulfide) compositions. In one aspect it relates to poly(arylene sulfide) compositions having improved strength characteristics, while also having improved processability.

One of the important uses of poly(arylene sulfide) polymers is in molding compositions. By combining poly(arylene sulfide) polymers with various other compounds like reinforcing agents such as glass fibers and fillers, molding compositions can be tailored for specific end uses. An important consideration in the molding of poly(arylene sulfide) compositions is the mold cycle time. The mold cycle time is the time required for a part to be injected and cooled before it can be ejected from the mold and a dimensionally acceptable part obtained. If a poly(arylene sulfide) part is ejected before optimum cooling, the part will expand and become larger than the mold it was molded in. Reduction of mold cycle time permits the part manufacturer to increase the production rate of parts and improve economics.

Often additives are incorporated in the polymer to reduce the mold cycle time. Other additives can also be incorporated in the polymer to aid in removing the polymer from the mold, to prevent mold corrosion, to provide desirable color to the polymer and so forth. Unfortunately, such additives often cause a reduction in the strength of a molded part.

Other desirable traits of a poly(arylene sulfide) polymer which is to be used for molding are ductility and toughness. Quite often polymer parts which display great strength are brittle and thus limited in applications where ductility and/or toughness are required.

It would be highly desirable to have a poly(arylene sulfide) polymer which achieved a mixture of good strength, good toughness, good ductility, and good processability (e.g. short molding cycles).

SUMMARY OF THE INVENTION

It is an object of this invention to provide poly(arylene sulfide) compositions exhibiting good strength, good toughness, good elongation, and good processability.

According to this invention a poly(arylene sulfide) composition is provided which consists essentially of 10 to 60 wt. % of a poly(arylene sulfide) resin which has first been polymerized to relatively high molecular weight and then optionally has been acid-treated and/or lightly cured, 1 to 30 wt. % of a highly cured poly(arylene sulfide) polymer which was initially polymerized to relatively low molecular weight, 5.0 to 60.0 wt. % glass fiber, 0.05 to 3.0 wt. % of a mold corrosion inhibitor, 0.01 to 3.0 wt. % of a nucleating agent, 0.10 to 5.0 wt. % of a coupling agent, 0.01 to 3.0 wt. % of a mold release agent, and optionally 0.01 to 10.0 wt. % of a pigment or filler.

DETAILED DESCRIPTION OF THE INVENTION

Examples of poly(arylene sulfide) polymers useful in this invention are those prepared according to U.S. Pat. Nos. 3,919,177, 3,354,129, 4,038,261, 4,038,262, 4,116,947, 4,282,347 and 4,350,810, which patents are hereby incorporated by reference. The poly(arylene sulfide) polymers are generally prepared by contacting reactants comprising a dihalosubstituted aromatic compound, a sulfur source and a polar organic compound under polymerization conditions. Those polymers which were initially polymerized to relatively high molecular weight may also be prepared using alkali metal carboxylates and/or polyhaloaromatic compounds during polymerization.

Specific examples of poly(arylene sulfide) polymers suitable for purposes of this invention include poly(2,4-toluene sulfide), poly(4,4'-biphenylene sulfide) and poly(phenylene sulfide). Because of its availability and desirable properties (such as high chemical resistance, non-flammability, and high strength and hardness) poly(phenylene sulfide) is the presently preferred poly(arylene sulfide).

It is preferred to employ a blend of poly(arylene sulfide) polymers, one of which is initially polymerized to relatively high molecular weight and then optionally acid treated and/or lightly cured and the other of which is initially polymerized to relatively low molecular weight and then highly cured. Both polymers are essentially linear prior to curing. Essentially linear poly(arylene sulfide), as used herein, is defined as a polymer having no or relatively little branching. For example, the amount of polyhaloaromatic impurity found in the dihaloaromatic used in the poly(arylene sulfide) polymerization process would not be sufficient to cause the resultant poly(arylene sulfide) to be outside the essentially linear definition. Furthermore, the use of relatively low levels of polyhaloaromatic compounds as described in the previously cited patents would not typically produce polymers which were outside the essentially linear definition.

The employment of a blend of the above-described two types of poly(arylene sulfide) polymers is advantageous for several reasons. One benefit of using such a blend is that the replacement of a portion of the optionally acid treated and/or lightly cured component with the more highly cured material, which is more cheaply produced, results in a more cost efficient commercial production.

Another advantage of using a blend is that, in the case of a blend comprising a poly(phenylene sulfide) initially polymerized to relatively high molecular weight, optionally acid treated and/or lightly cured, the use of a blend component comprising a poly(phenylene sulfide) initially polymerized to relatively low molecular weight and then highly cured, imparts a desirable color to the formulation such that pigments such as, for example, iron oxide, which often adversely affect mechanical properties, need not be employed.

The amount of the optionally lightly cured poly(arylene sulfide) polymer employed is generally in the range of 10 to 60 wt. % of the composition. The amount of the more highly cured polymer is generally in the range of 1 to 30 wt. %, preferably 2 to 25 wt. % of the composition.

The poly(arylene sulfide) initially polymerized to relatively high molecular weight can be prepared by the process described in U.S. Pat. No. 3,919,177, or by any other process known to those of ordinary skill in the art which produces a high molecular weight poly(arylene sulfide) polymer. The preferred high molecular weight poly(arylene sulfide) is poly(phenylene sulfide). The melt flow of the high molecular weight poly(phenylene sulfide) is less than about 1,000 prior to curing and about 25 to about 500, preferably about 75 to about 450, after curing, if cured. If the high molecular weight poly(arylene sulfide) is not cured, it is preferred to use a polymer having a flow rate in the range of 100 to 600 g/10 min.

The melt flow of all poly(phenylene sulfide) polymers referred to herein is determined using ASTM D 1238 Condition 315/5.0 modified to use a 5 minute preheat time.

The high molecular weight poly(arylene sulfide) is optionally acid washed during the poly(arylene sulfide) recovery process according to a process similar to that disclosed in U.S. Pat. No. 4,801,664. Any suitable organic or inorganic acid which is water soluble can be used in the acid washing process. Examples of suitable organic acids include, but are not limited to, acetic acid, formic acid, oxalic acid, fumaric acid, and monopotassium phthalic acid. the presently preferred organic acid is acetic acid. Examples of suitable inorganic acids include, but are not limited to, hydrochloric acid, monoammonium phosphate, sulfuric acid, phosphoric acid, boric acid, nitric acid, sodium dihydrogenphosphate, ammonium dihydrogenphosphate, and carbonic acid. The presently preferred inorganic acid is hydrochloric acid.

The relatively low molecular weight poly(arylene sulfide) can be prepared by the process of U.S. Pat. No. 3,354,129, but any process which produces a relatively low molecular weight poly(arylene sulfide) is acceptable. The preferred relatively low molecular weight poly(arylene sulfide) is poly(phenylene sulfide). The melt flow of the relatively low molecular weight poly(phenylene sulfide) is about 3,000 to about 30,000 prior to curing and about 20 to about 200, preferably about 30 to about 150, after curing.

Curing is defined herein as a distinct process step after polymer drying, comprising a thermal treatment of the polymer in the presence of an oxygen-containing atmosphere. The preferred oxygen-containing atmosphere is air. In one curing process, the treatment can be above the melting point for semi-crystalline polymers or alternately, the treatment can be above the glass transition point for amorphous polymers. A second curing process is a solid state process in which the polymer is heated to a temperature up to, but below the melting point of a semi-crystalline polymer or alternately, up to but below the softening temperature of an amorphous polymer. The solid state curing process is currently preferred for curing large quantities of polymer, such as in a commercial process. For example, the solid state curing of poly(phenylene sulfide), which has a melting point of about 540° F., is generally carried out at a temperature of about 350° F. to about 500° F.

The glass fiber employed in this present invention can be chosen from any of those products commercially available which are typically used as fillers and reinforcing agents in polymeric compositions. Generally, glass fibers of about 1/32 to about 2 inches in length are used as feedstocks in the invention composition.

The glass fiber employed in the composition generally will have a diameter of less than about 13 microns. The presently preferred glass fiber is G-filament type glass fiber. An example of a G-filament type glass fiber is Owens Corning 497EE which has an average diameter of about 9 microns.

The glass fiber is generally present in an amount of about 5.0 to 60, preferably about 30 to about 50 weight percent and most preferably about 35 to about 45 weight percent based on the total composition.

Hydrotalcites are employed in this invention as mold corrosion inhibitors. The hydrotalcites employed in this invention can be a natural or synthetic material which corresponds roughly to naturally-occurring minerals having chemical structures such as $Mg_6Al_2(OH)_{16}CO_3.4H_2O$ or $Al_2O_3.6MgO.CO_2.12H_2O$. Although the magnesium/aluminum hydrates are the most common cationic species for the hydrotalcites, various metals can be substituted. For example, magnesium can be replaced by calcium, zinc, copper, manganese, lithium or nickel; and aluminum can be replaced by chromium (plus 3) or iron. The anionic species can also vary, with carbonate or phosphate the most likely candidates. The most readily available hydrotalcite compounds will be magnesium-aluminum hydroxy carbonate hydrates. The preferred hydrotalcite compound is magnesium aluminum hydroxy carbonate hydrate, which is available under the commercial name DHT-4A sold by Kyowa Chemical Industry Company, Ltd., Osaha, Japan, which is characterized by the manufacturer as $Mg_{4.5}Al_2(OH)_{13}CO_3.3.5 H_2O$.

The amount of hydrotalcite employed in the present invention is generally in the range of 0.05 to 3.0 wt. %, more preferably 0.1 to 2.0 wt. % of the total composition.

The nucleating agents which can be employed in this invention are any additives which are effective to achieve the desired crystalline morphology modification of the poly(arylene sulfide). Usually the agent will comprise a polymer-containing additive since polymers are expected to be readily compatible with the other components. Usually, it will also be crystallizable and have a high crystalline melt point. The preferred nucleating agents are polymers selected from polyaryl ketones such as poly(arylene sulfide-ketone)s. It is preferred that the polyaryl ketone have a melting point of at least about 20° C. above the melting point of the poly(arylene sulfide) and more preferably at least about 40° C. to about 100° C. above the poly(arylene sulfide) melting point.

The most preferred nucleating agent is a poly(ether ether ketone) such as, for example, poly(1,4-oxyphenyloxy-p,p'-benzophenone). This polymer is commercially available from ICI.

The amount of nucleating agent present in the invention composition is generally in the range of 0.01 to 3.0 wt. %, more preferably 0.05 to 2.0 wt. % of the total composition.

The compositions of the invention contain an organosilane compound selected from the group of epoxy functional silanes. The preferred epoxy functional silane is gamma-glycidoxypropyltrimethoxysilane.

Such organosilanes will generally be present in the compositions of the invention in an amount of from about 0.01 to about 2 weight percent, preferably from about 0.4 to about 1.2 weight percent, and most preferably from about 0.6 to about 1.0 weight percent based on the weight of the total composition.

A mold release agent is incorporated in the invention composition. Any suitable mold release agent can be employed, however, it is preferred to use polyethylene. If a polyethylene is used, a high density polyethylene is preferred.

The amount of mold release agent present in the invention composition is generally in the range of 0.01 to 3.0 wt. %, preferably 0.05 to 2.0 wt. % of the total composition.

The pigments which can optionally be employed in the invention composition are those known to those of ordinary skill in the art, which can tolerate the relatively high processing temperatures required, e.g. 600° F. for poly(arylene sulfide). Typical examples include titanium dioxide, iron oxide, cadmium sulfide, phthalocyanine blue, carbon black and the like and mixtures thereof.

The amount of pigment used, if present, is typically in the range of 0.01 to 10.0 wt. %, preferably 0.05 to 2.0 wt. % of the total composition.

The compositions of this invention can be made in accordance with any method wherein the poly(arylene sulfide), glass fiber, and other components are combined to form a mixture. Many suitable methods are well known to those of skill in the art. By way of example, the components of the composition can be mixed together at room temperature in a rotating drum blender or in an intensive mixer, such as a Henschel mixer, and then extrusion compounded and pelletized at a temperature above about the melting point of the poly(arylene sulfide) to produce a uniform blend.

Once made, the compositions of the invention can be used to form molded articles in accordance with any method suitable for molding thermoplastic compositions. Such methods are well known in the art. The compositions can, for example, be introduced into an injection molding apparatus to produce a melt which is extruded into an injection mold wherein the molded article is formed.

The following examples are provided in order to further illustrate the invention and are not meant to limit the scope thereof.

EXAMPLE 1

A first poly(phenylene sulfide) (PPS) was prepared using techniques essentially like those disclosed in U.S. Pat. No. 3,919,177. This polymer was then subjected to an acid treatment essentially like that disclosed in U.S. Pat. No. 4,801,664. This polymer was then very lightly air cured using techniques essentially like those disclosed in U.S. Pat. No. 3,354,129 to reduce its flow rate (determined as described previously) to within the range of 50–500 g/10 min. This polymer is hereinafter referred to as Resin 1.

A second poly(phenylene sulfide) was prepared using essentially those techniques described in U.S. Pat. No. 3,354,129. This polymer was highly air cured using essentially the methods disclosed in U.S. Pat. No. 3,354,129 to reduce its flow rate to within the range of 20–200 g/10 min. This polymer is hereinafter referred to as Resin 2.

Compounds were prepared by tumble blending mixtures of PPS powder, glass fiber and additives in a plastic bag. The fiberglass and additives were selected from G-filament fiberglass, in this example OC497EE supplied by Owens-Corning; an epoxysilane, in this example gamma-glycidoxypropyltrimethoxysilane available from Union Carbide as TC-100; a hydrotalcite, in this example DHT-4A supplied by Kyowa Chemical Industry; a polyetheretherketone, in this example 380 P supplied by ICI; and a high density polyethylene, in this example TR-161 supplied by Phillips Chemical Company. This dry blend was then melt mixed in a 1.5-inch, 24:1 (L:D), Davis-Standard, single screw extruder at temperature settings of 620°–640° F. Extrudate was chopped and then molded into test specimens using an Arburg ECO 305 injection molder using procedures known to those skilled in the art. All samples were annealed for two hours at 392° F. before testing. Mechanical properties were determined using ASTM procedures D638 and 790. Results are shown in Table I.

TABLE I

| Compound | A | B | C | D |
|---|---|---|---|---|
| Resin 1, wt. % | 57.35 | 43 | 37.25 | — |
| Resin 2, wt. % | — | 14.35 | 20 | 57.35 |
| Fiberglass, wt. % | 40 | 40 | 40 | 40 |
| Epoxysilane, wt. % | 0.8 | 0.8 | 0.8 | 0.8 |
| Hydrotalcite, wt. % | 1 | 1 | 1 | 1 |
| Polyethylene, wt. % | 0.25 | 0.25 | 0.25 | 0.25 |
| Polyetheretherketone, wt. % | 0.6 | 0.6 | 0.6 | 0.6 |
| Viscosity, poise$^{(a)}$ | 3640 | 3570 | — | 4220 |
| Flexural modulus, Msi | 2.1 | 2.1 | 2.1 | 2.2 |
| Flexural strength, Ksi | 40.0 | 39.9 | 40.3 | 34.0 |
| Tensile, Ksi | 25.7 | 26.6 | 26.8 | 24.3 |
| Elongation, % | 1.48 | 1.50 | 1.50 | 1.19 |
| Izod impact, ft lb/in | | | | |
| notched | 1.6 | 1.7 | 1.6 | 1.6 |
| unnotched | 12.3 | 13.0 | 11.7 | 6.6 |
| Tensile at 150° C., Ksi | 10.0 | 10.9 | 10.8 | 12.3 |
| Hydrolytic stability$^{(b)}$ | | | | |
| Aged tensile, Ksi | 17.8 | 19.1 | 19.2 | 17.1 |
| Retained, % | 69 | 72 | 72 | 70 |
| Weld line retention, %$^{(c)}$ | 43 | 44 | 34 | 26 |

$^{(a)}$400 sec$^{-1}$ and 316° C.
$^{(b)}$Tensile strength measured after exposure to water at 250° F. at 15 psig for 150 hours and compared with original tensile strength without such exposure.
$^{(c)}$Tensile strength determined on bar gated from both ends and compared to tensile strength of similar specimen molded with gating on only one end.

As the data in Table I show, Compounds B and C, made from a blend of PPS types, exhibited mechanical properties which were equivalent to or superior to those of Compounds A and D, made using each of the individual blend components. This was also true for the viscosity and weld line retention values for Compound B and for the hydrolytic stability of Compounds B and C. It was also noted that Compounds B and C were darker in color than was Compound A and were closer in color to Compound D than was Compound A.

EXAMPLE 2

A PPS polymer was prepared in essentially the same manner as Resin 1, except that from the initial polymerization, the polymer was recovered using a technique of partially cooling the reactor and adding additional polar organic compound. Also, although this polymer was subjected to the acid treatment used for Resin 1, this polymer was not subjected to the light air curing used for Resin 1. This polymer is hereinafter referred to as Resin 3.

Another PPS polymer was prepared in essentially the same manner as Resin 2, except that this polymer was not cured to as low a melt flow as that of Resin 2 but still within the 20–200 g/10 min. range. This polymer is hereinafter referred to as Resin 4.

Compounds were prepared and tested using the techniques, fiberglass and additives described in Example I for the preparation of Resins 1 and 2. Results are shown in Table II.

TABLE II

| Compound | E | F | G | H |
|---|---|---|---|---|
| Resin 3, wt. % | 57.35 | 48.75 | 43.05 | — |
| Resin 4, wt. % | — | 8.6 | 14.3 | 57.35 |
| Fiberglass, wt. % | 40 | 40 | 40 | 40 |
| Epoxysilane, wt. % | 0.8 | 0.8 | 0.8 | 0.8 |
| Hydrotalcite, wt. % | 1 | 1 | 1 | 1 |
| Polyethylene, wt. % | 0.25 | 0.25 | 0.25 | 0.25 |
| Polyetheretherketone, wt. % | 0.6 | 0.6 | 0.6 | 0.6 |
| Flexural modulus, Msi | 2.1 | 2.2 | 2.2 | 2.2 |
| Flexural strength, Ksi | 42.0 | 42.7 | 41.3 | 34.5 |
| Tensile, Ksi | 28.5 | 29.7 | 29.2 | 24.0 |
| Elongation, % | 1.72 | 1.73 | 1.73 | 1.21 |
| Izod impact, ft lb/in | | | | |

TABLE II-continued

| Compound | E | F | G | H |
|---|---|---|---|---|
| notched | 2.0 | 1.9 | 1.9 | 1.7 |
| unnotched | 13.9 | 13.5 | 12.7 | 7.4 |
| Tensile at 150° C., Ksi | 11.0 | 11.6 | 11.4 | 12.2 |
| Hydrolytic stability[a] | | | | |
| Aged tensile, Ksi | 17.4 | 18.9 | 17.3 | 17.7 |
| Retained, % | 61 | 64 | 59 | 74 |

[a]Tensile strength measured after exposure to water at 250° F. at 15 psig for 150 hours and compared with original tensile strength without such exposure.

The data in Table II indicate that Compounds F and G, made from a blend of PPS types, exhibited mechanical properties which were equivalent to or superior to those of Compounds E and H, made using each of the individual blend components. This was also true for the hydrolytic stability of Compounds F and G. It was also noted that Compounds F and G are darker in color than was Compound E and were nearer in color to Compound H than was Compound E.

EXAMPLE 3

A PPS polymer was prepared using essentially the same procedures as were used for the preparation of Resins 2 and 4 except that the degree of air curing was substantially less for this polymer than was used for Resins 2 and 4, resulting in a polymer with a substantially higher flow rate of approximately 800 g/10 min. This polymer is hereinafter referred to as Resin 5.

Using Resin 5 and Resin 1, compounds were prepared and tested using the techniques, fiberglass and additives in the preparation of Resins 1 and 2 in Example 1. Results are shown in Table III.

TABLE III

| Compound | J | K | L | M |
|---|---|---|---|---|
| Resin 1, wt. % | 57.35 | 48.75 | 43.05 | 37.35 |
| Resin 5, wt. % | — | 8.6 | 14.3 | 20.0 |
| Fiberglass, wt. % | 40 | 40 | 40 | 40 |
| Epoxysilane, wt. % | 0.8 | 0.8 | 0.8 | 0.8 |
| Hydrotalcite, wt. % | 1 | 1 | 1 | 1 |
| Polyethylene, wt. % | 0.25 | 0.25 | 0.25 | 0.25 |
| Polyetheretherketone, wt. % | 0.6 | 0.6 | 0.6 | 0.6 |
| Viscosity, poise[a] | 3860 | 3613 | 3482 | — |
| Flexural modulus, Msi | 2.1 | 2.1 | 2.1 | 2.2 |
| Flexural strength, Ksi | 40.5 | 40.3 | 40.5 | 37.8 |
| Tensile, Ksi | 26.0 | 27.0 | 27.8 | 25.8 |
| Elongation, % | 1.36 | 1.61 | 1.63 | 1.46 |
| Izod impact, ft lb/in | | | | |
| notched | 1.8 | 1.9 | 1.8 | 1.6 |
| unnotched | 12.6 | 13.3 | 11.9 | 8.9 |
| Tensile at 150° C., Ksi | 10.4 | 10.9 | 11.1 | 11.4 |
| Hydrolytic stability | | | | |
| Aged tensile, Ksi | 19.2 | 19.8 | 19.1 | 18.4 |
| Retained, % | 74 | 73 | 69 | 71 |

[a]400 sec$^{-1}$ and 316° C.

While this invention has been described in detail for the purpose of illustration, it is not meant to be limited in scope thereby, but is intended to cover all reasonable modifications thereof.

That which is claimed is:

1. A poly(arylene sulfide) composition suitable for injection molding which consists essentially of
    a) 10 to 60 wt. % of a high molecular weight poly(arylene sulfide) polymer prepared by acid-washing an essentially linear poly(arylene sulfide) polymer having a melt flow of less than 1000 g/10 min. subsequent to said acid-washing and when in an uncured state;
    b) 1 to 30 wt. % of cured relatively low molecular weight poly(arylene sulfide) polymer, produced by curing an essentially linear poly(arylene sulfide) polymer, wherein said relatively low molecular weight poly(arylene sulfide) polymer has a melt flow in the range of 3,000 to 30,000 g/10 min. prior to be being cured;
    c) 5.0 to 60 wt. % glass fibers;
    d) 0.05 to 3.0 wt. % of a hydrotalcite;
    e) 0.01 to 3.0 wt. % of a nucleating agent;
    f) 0.10 to 5.0 wt. % of an organosilane;
    g) 0.01 to 3.0 wt. % of a mold release agent; and
    h) 0.01 to 10.0 wt. % of a pigment; wherein said wt. percentages are based on the total weight of said composition.

2. A composition according to claim 1 wherein both of said poly(arylene sulfide) polymers are poly(phenylene sulfide).

3. A composition according to claim 1 wherein said high molecular weight poly(phenylene sulfide) polymer is produced by lightly curing an essentially linear high molecular weight poly(phenylene sulfide) polymer so that said cured high molecular weight poly(phenylene sulfide) has a melt flow in the range of 25 to 500 g/10 min.

4. A composition according to claim 1 wherein said uncured high molecular weight poly(phenylene sulfide) has a melt flow in the range of 100 to 600 g/10 min.

5. A composition according to claim 1 wherein said cured relatively low molecular weight poly(phenylene sulfide) has a melt flow in the range of 20 to 200 g/10 min.

6. A composition according to claim 1 wherein said glass fiber used in producing said composition has a length prior to addition to the composition in the range of 1/32 to 2 inches and a diameter of less than 13 microns.

7. A composition according to claim 1 wherein said hydrotalcite is selected from the group consisting of natural and synthetic materials containing magnesium, aluminum, calcium, zinc, copper, manganese, lithium, nickel or chromium cations.

8. A composition according to claim 7 wherein said hydrotalcite is characterized by the structure $Mg_{4.5}Al_2(OH)_{13}CO_3 \cdot 3.5\ H_2O$.

9. A composition according to claim 1 wherein said nucleating agent is a polymer-containing additive.

10. A composition according to claim 9 wherein said nucleating agent is a poly(aryl ketone).

11. A composition according to claim 10 wherein said nucleating agent is a poly(ether ether-ketone).

12. A composition according to claim 1 wherein said organosilane is an epoxy functional silane.

13. A composition according to claim 12 wherein said epoxy functional silane is gamma-glycidoxypropyltrimethoxysilane.

14. A composition according to claim 1 wherein said mold release agent is a high density polyethylene.

15. A composition according to claim 1 wherein said pigment is carbon black.

16. A composition which consists essentially of
    a) 10 to 60 wt. % of an acid-treated, lightly cured high molecular weight poly(phenylene sulfide) polymer having a melt flow rate in the range of 75 to 450 g/10 min.;
    b) 1 to 30 wt. % of a cured, relatively low molecular weight poly(phenylene sulfide) polymer having a melt flow in the range of 30 to 150 g/10 min.;

c) 35 to 45 wt % of glass fibers having average lengths between 1/32 to 2 inches prior to addition to said composition and a fiber diameter in the range of 8 to 10 microns;
d) 0.1 to 2.0 wt. % of $Mg_{4.5}Al_2(OH)_{13}CO_3.3.5\ H_2O$;
e) 0.05 to 2.0 wt. % of a poly(ether ether ketone) polymer;
f) 0.6 to 1.0 wt. % gamma-glycidoxypropyltrimethyoxysilane;
g) 0.05 to 2.0 wt. % of a high density polyethylene; and
h) 0.05 to 2.0 wt. % carbon black; wherein said weight percentages are based on the total weight of said composition.

17. A poly(arylene sulfide) composition suitable for injection molding which consists essentially of
a) 10 to 60 wt. % of a high molecular weight poly(arylene sulfide) polymer prepared by acid-washing an essentially linear poly(arylene sulfide) polymer having a melt flow of less than 1000 g/10 min. subsequent to said acid-washing and when in an uncured state.
b) 1 to 30 wt. % of cured relatively low molecular weight poly(arylene sulfide) polymer, produced by curing an essentially linear poly(arylene sulfide) polymer, wherein said relatively low molecular weight poly(arylene sulfide) polymer has a melt flow in the range of 3,000 to 30,000 g/10 min. prior to being cured;
c) 5.0 to 60 wt. % glass fibers;
d) 0.05 to 3.0 wt. % of a hydrotalcite;
e) 0.01 to 3.0 wt. % of a nucleating agent;
f) 0.10 to 5.0 wt. % of an organosilane; and
g) 0.01 to 3.0 wt. % of a mold release agent; wherein said wt. percentages are based on the total weight of said composition.

18. A composition according to claim 17 wherein both of said poly(arylene sulfide) polymers are poly(phenylene sulfide).

19. A composition according to claim 17 wherein said high molecular weight poly(phenylene sulfide) polymer is produced by lightly curing an essentially linear high molecular weight poly(phenylene sulfide) polymer so that said cured high molecular weight poly(phenylene sulfide) polymer has a melt flow in the range 25 to 500 g/10 min.

20. A composition according to claim 17 wherein said uncured high molecular weight poly(phenylene sulfide) has a melt flow in the range of 100 to 600 g/10 min.

21. A composition according to claim 17 wherein said cured relatively low molecular weight poly(phenylene sulfide) has a melt flow in the range of 20 to 200 g/10 min.

22. A composition according to claim 17 wherein said glass fiber has a length prior to addition to said composition in the range of 1/32 to 2 inches and a diameter of less than 13 microns.

23. A composition according to claim 17 wherein said hydrotalcite is selected from the group consisting of natural and synthetic materials containing magnesium, aluminum, calcium, zinc, copper, manganese, lithium, nickel or chromium cations.

24. A composition according to claim 23 wherein said hydrotalcite is characterized by the structure $Mg_{4.5}Al_2(OH)_{13}CO_3.3.5\ H_2O$.

25. A composition according to claim 17 wherein said nucleating agent is a polymer-containing additive.

26. A composition according to claim 25 wherein said nucleating agent is a poly(aryl ketone).

27. A composition according to claim 26 wherein said nucleating agent is a poly(ether ether-ketone).

28. A composition according to claim 17 wherein said organosilane is an epoxy functional silane.

29. A composition according to claim 28 wherein said epoxy functional silane is gamma-glycidoxypropyl-trimethoxysilane.

30. A composition according to claim 17 wherein said mold release agent is a high density polyethylene.

31. A composition which consists essentially of
a) 10 to 60 wt. % of an acid-treated, lightly cured, high molecular weight poly(phenylene sulfide) polymer having a melt flow rate in the range of 75 to 450 g/10 min;
b) 1 to 30 wt. % of a cured, relatively low molecular weight poly(phenylene sulfide) polymer having a melt flow in the range of 50 to 150 g/10 min.;
c) 35 to 45 wt. % of glass fibers having average lengths between 1/32 to 2 inches and a fiber diameter in the range of 8 to 10 microns;
d) 0.1 to 2.0 wt. % of $Mg_{4.5}Al_2(OH)_{13}CO_3.3.5\ H_2O$;
e) 0.05 to 2.0 wt. % of a poly(ether ether ketone) polymer;
f) 0.6 to 1.0 wt. % gamma-glycidoxypropyltrimethyoxysilane; and
g) 0.05 to 2.0 wt. % of a high density polyethylene; wherein said weight percentages are based on the total weight of said composition.

32. An injection molded part prepared using the composition of claim 1.

33. An injection molded part prepared using the composition of claim 17.

* * * * *